May 23, 1961  L. M. KETTERING  2,985,190
PILOT VALVES HAVING CIRCULAR OUTLET PORTS MODIFIED
TO HAVE THE GAIN CHARACTERISTICS OF SQUARE PORTS
Filed Dec. 11, 1956

INVENTOR.
Lee M. Kettering
BY Gerald B. Hoflot
his attorney

United States Patent Office 2,985,190
Patented May 23, 1961

2,985,190

PILOT VALVES HAVING CIRCULAR OUTLET PORTS MODIFIED TO HAVE THE GAIN CHARACTERISTICS OF SQUARE PORTS

Lee M. Kettering, Orrville, Ohio, assignor to Hagan Chemicals & Controls, Inc., a corporation of Pennsylvania Filed Dec. 11, 1956, Ser. No. 627,638

6 Claims. (Cl. 137—622)

This invention relates to pilot valves.

Pilot valves as heretofore constructed have been objectionable in that they had a low gain for small movements of the valve from closed position. This was because the ports controlled by the lands of the valve were circular. Therefore, a relatively large travel of the valve from neutral or closed position was required in order to obtain sufficient output.

The ideal high gain valve should have square ports, but such ports are prohibitively expensive, because costly, time consuming, machining operations are required to form them to the accuracy required in pilot valves.

An object of this invention is to provide a pilot valve that has a high gain for small movements of the valve from closed position.

A still further object is to provide a valve having circular ports which have been so modified as to give to them the effective high gain of square ports without the expense of forming the latter.

The above and other objects of the invention will be apparent to those of ordinary skill in the art to which the invention pertains from the following description taken in conjunction with the accompanying drawings and the appended claims.

Figure 1:
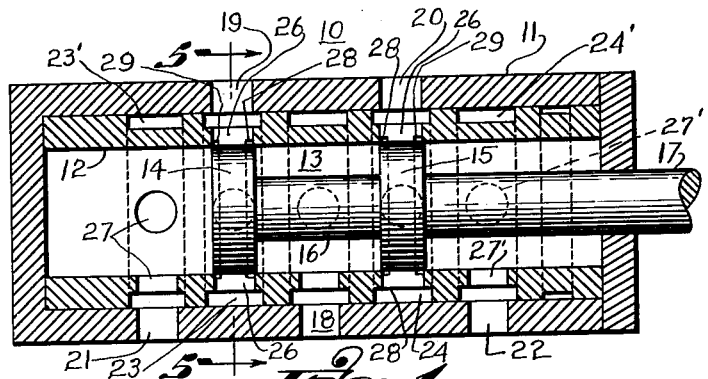
Figure 1 is a view in longitudinal section of a pilot valve embodying a form of the invention, the valve being in closed position.

In the several views of the drawing a high gain pilot valve 10 is illustrated as embodying what now appears to be a preferred form of the invention. Valve 10 comprises a body 11 having therein a sleeve 12 and a valve 13 having lands 14 and 15 connected by a spindle 16. The valve is provided with a stem 17 which may be connected to any suitable operating or control device.

The valve body is provided with an inlet port 18, outlet ports 19 and 20 and drain ports 21 and 22. The sleeve 12 is provided with exterior annular grooves 23 and 24 so located as to be in register with the outlet ports 19 and 20. The grooves 23 and 24 form with the body annular ducts for distributing the flow of fluid. Annular ducts 23' and 24' are similarly provided for the drain ports. The sleeve 12 is provided with a plurality of circular ports 26 in the wall of the sleeve at the locations of the ducts 23 and 24 so as to provide ample, distributed flow from the supply or inlet port. The sleeve is also provided with ports 27 and 27' that communicate with the drain ports and the outlet ports.

In order that the valve may have high gain, the interior of the valve sleeve 12 is provided with annular chordal grooves 28 and 29 on diametrically opposite sides of the circular ports 26, namely, at the output and discharge sides thereof, thereby serving to increase the gain of the valve by materially increasing the flow opening thereof in response to relatively short travel from its closed position in either direction.

As shown in Fig. 1, the lands 14 and 15 when the valve is in closed position cover not only the circular ports 26, but also the chordal grooves 28 and 29. These chordal grooves as shown are extended around the entire circumference of the valve sleeve at the location of the ports 26.

When the valve is in the closed position shown in Figure 1, the supply of fluid, say an hydraulic fluid connected to the port 18, is blocked by the two lands 14 and 15. Therefore, there can be no flow from the inlet port to either of the outlet ports 19 or 20. For the same reason there can be no reverse flow through either of ports 19 and 20 to the drain ports 21 and 22.

Figure 2:
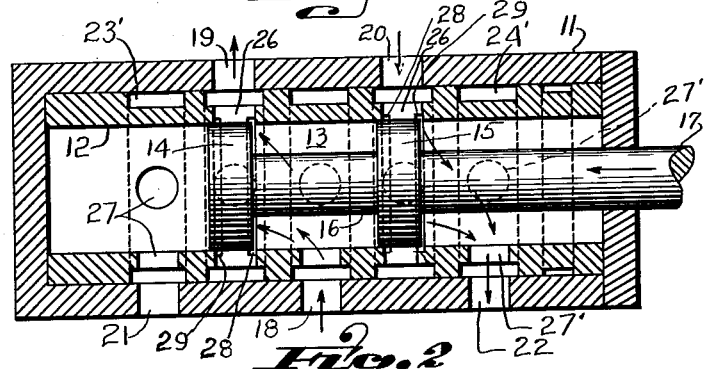
Figs. 2 and 3 are views similar to Fig. 1, but showing the valve in its two output positions.

If the valve is moved to the left as shown in Fig. 2, the chordal groove 28, associated with ports 26 serving the outlet port 19, is uncovered. Since that chordal groove communicates with the circular ports, supplying port 19, a relatively wide, large flow opening is provided even through valve 13 has traveled but a short distance from closed position. Therefore, a high gain is obtained. When the valve moves in the direction indicated by Fig. 2, the chordal groove 28, associated with ports 26 serving the outlet port 20, is uncovered so that there may be reverse flow through port 20 into the sleeve and thence to the drain through ports 27' and 22. Therefore, the same high gain is obtained, i.e. a large flow opening results from relatively small increments of travel of the valve from closed position.

Figure 3:
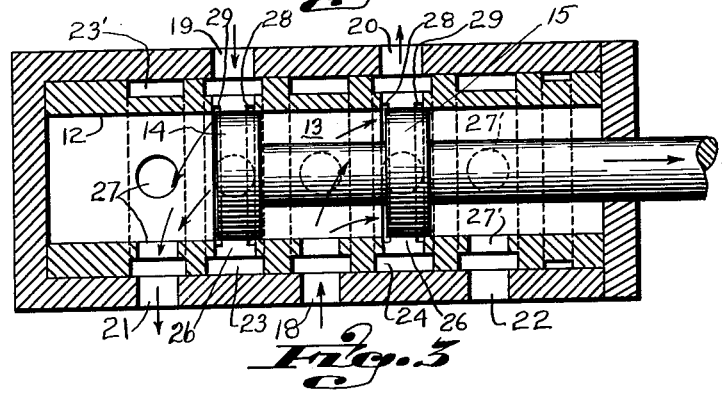
Figure 4:
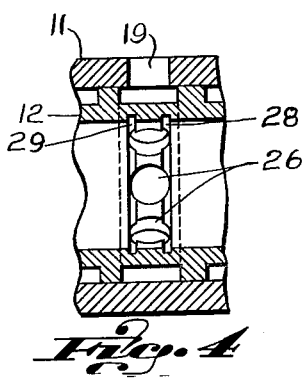
Fig. 4 is a fragmentary view in longitudinal section of the valve body and sleeve which illustrates the construction of the outlet ports for the body and sleeve.
Figure 5:
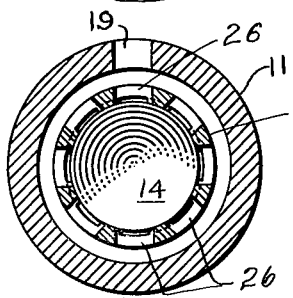
Fig. 5 is a view in section taken on line 5—5 of Fig. 1.

In Figure 3 the action of the valve when moving in the opposite direction is shown. When moving in that direction, the chordal groove 29 places the port 19 in communication with the drain port 21 through the sleeve ports 27 and the chordal groove 29 and so much of the circular ports 26 as are uncovered. At the same time, the chordal groove 28 associated with the outlet port 20 is uncovered whereby there is flow to the same from the inlet port 18. Thus high gain openings of the valve are effected for short travel of the valve in both the output and the drain positions.

A valve such as shown in the drawings is particularly adapted for controlling the operation of hydraulically actuated power cylinders for example. In such applications the outlet ports 19 and 20, as is well known, would be connected to the opposite ends of the cylinder and the drain ports 21 and 22 would be connected to the sump of a pump. Thus when the valve moves in the direction shown in Fig. 2, fluid is admitted to one end of the cylinder by port 19 and exhausted through ports 20, 27', and 22. Likewise, when the valve moves to the position indicated by Fig. 3, the fluid is delivered from the supply port 18 through the outlet port 20 to the opposite end of the power cylinder; the drainage from the opposite end would pass through the port 19, the openings controlled by the land 14 and the ports 27 and 21 to the drain.

Having thus described the invention, it will be apparent to those of ordinary skill in the art to which the invention pertains, that various modifications and changes may be made without departing from either the spirit or the scope thereof.

Therefore, what is claimed as new and desired to be secured by Letters Patent is:

1. A high gain pilot valve comprising a body having an inlet port and an outlet port, a valve sleeve in the body, means providing a first annular space between the body and the sleeve that communicates with the outlet port, means providing an annular space between the body and sleeve communicating with the inlet port, said sleeve having spaced substantially circular ports communicating with said first annular space and the interior of said sleeve, the interior of the sleeve having an annular chordal groove on the side of each circular port on the output side thereof, and a valve in said sleeve having spaced lands disposed on opposite sides of the inlet port, one of said lands being arranged to cover and uncover said circular ports and said chordal groove, the chordal groove providing a relatively large flow area and high gain per increment of movement of the valve from closed position.

2. A high gain pilot valve comprising a body having an inlet port and an outlet port, a valve sleeve in the body, means providing a first annular space between the body and the sleeve that communicates with the outlet port, means providing an annular space between the body and sleeve communicating with the inlet port, said sleeve having spaced substantially circular ports communicating with said first annular space and the interior of said sleeve, the interior of the sleeve having annular chordal grooves on diametrically opposite sides of each circular port, one side being the output side of the ports and the opposite side the discharge side thereof, and a valve in said sleeve having spaced lands disposed on opposite sides of the inlet port, one of said lands being arranged to cover and uncover said circular ports and said chordal grooves, the chordal groove on the output side providing a relatively large flow area and high gain for relatively small increments of movement of the valve from closed position and the other chordal groove providing a relatively high gain for small increments of movement of the valve from closed to discharge position.

3. A high gain pilot valve comprising a body having an inlet port and an outlet port on each side of the inlet port, a valve sleeve in the body, means providing an annular groove between the body and the sleeve at the location of each outlet port, means providing an annular space between the body and sleeve communicating with the inlet port, said sleeve having spaced circular ports providing communication between the respective annular grooves and the interior of the sleeve, the interior of said sleeve having annular chordal grooves communicating with each of the circular ports associated with said outlet ports, and a valve in said sleeve having spaced lands controlling said outlet ports, said chordal grooves providing relatively large flow openings and high gain for relatively small increments of travel of the valve from closed position.

4. A high gain pilot valve comprising a body having an inlet port and an outlet port on each side of the inlet port, a valve sleeve in the body, means providing an annular groove between the body and sleeve at the location of each outlet port, said sleeve having spaced circular ports providing communication between the respective annular grooves and the interior of the sleeve, means providing an annular space between the body and sleeve communicating with the inlet port, the interior of said sleeve having annular chordal grooves on diametrically opposite sides of the circular ports of each outlet port, and a valve in said sleeve having spaced lands controlling said outlet ports, said chordal grooves providing relatively large flow openings and high gain for relatively small increments of travel of the valve from closed to open position and relatively high gain for relatively small increments of travel of the valve from closed position to discharge position.

5. A high gain sleeve for a hydraulic pilot valve, said sleeve having an inlet port and outlet ports adapted to be controlled by the lands of a valve, the outlet ports comprising a plurality of annularly spaced circular openings having an annular chordal groove on the side of said openings in the interior of the sleeve.

6. A high gain sleeve for a hydraulic pilot valve, said sleeve having an inlet port and outlet ports adapted to be controlled by the lands of a valve, the outlet ports each comprising a plurality of annularly spaced circular openings having annular chordal grooves on the diametrically opposed sides of said circular ports in the interior of the sleeve.

References Cited in the file of this patent

UNITED STATES PATENTS

| | | |
|---|---|---|
| 2,396,643 | De Ganahl | Mar. 19, 1946 |
| 2,528,901 | Morse | Nov. 7, 1950 |
| 2,667,181 | Ashton et al. | Jan. 26, 1954 |
| 2,708,909 | Curlett | May 24, 1955 |
| 2,765,378 | Perry et al. | Oct. 2, 1956 |
| 2,773,352 | Fujii | Dec. 11, 1956 |
| 2,785,699 | Creson et al. | Mar. 19, 1957 |
| 2,841,168 | Levetus et al. | July 1, 1958 |
| 2,904,075 | Markson | Sept. 15, 1959 |

FOREIGN PATENTS

| | | |
|---|---|---|
| 1,071,287 | France | Mar. 3, 1954 |
| 1,101,927 | France | Apr. 27, 1955 |